US012621188B2

(12) United States Patent
Åhlander et al.

(10) Patent No.: US 12,621,188 B2
(45) Date of Patent: May 5, 2026

(54) METHOD AND NETWORK NODE CONFIGURED FOR SELECTION OF TRANSMISSION LAYERS

(71) Applicant: Telefonaktiebolaget LM Ericsson (publ), Stockholm (SE)

(72) Inventors: Mats Åhlander, Solna (SE); Kevin Luo, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 349 days.

(21) Appl. No.: 18/562,916

(22) PCT Filed: May 26, 2021

(86) PCT No.: PCT/SE2021/050493
§ 371 (c)(1),
(2) Date: Nov. 21, 2023

(87) PCT Pub. No.: WO2022/250586
PCT Pub. Date: Dec. 1, 2022

(65) Prior Publication Data
US 2024/0235895 A1      Jul. 11, 2024

(51) Int. Cl.
H04L 25/02 (2006.01)
H04B 7/0456 (2017.01)
H04B 17/336 (2015.01)

(52) U.S. Cl.
CPC ....... H04L 25/0204 (2013.01); H04B 7/0456 (2013.01); H04B 17/336 (2015.01)

(58) Field of Classification Search
CPC ............. H04L 25/0204; H04L 25/0224; H04L 5/0048; H04L 5/0053; H04L 5/0023;
(Continued)

(56) References Cited

U.S. PATENT DOCUMENTS

| | | | |
|---|---|---|---|
| 2016/0204844 A1 | 7/2016 | Sandberg et al. | |
| 2019/0028233 A1 | 1/2019 | Bontu et al. | |

(Continued)

FOREIGN PATENT DOCUMENTS

| | | |
|---|---|---|
| WO | 2019222913 A1 | 11/2019 |
| WO | 2021038273 A1 | 3/2021 |
| WO | 20211229264 A1 | 11/2021 |

OTHER PUBLICATIONS

Extended European Search Report and Opinion for European Patent Application No. 21943233.3 mailed Jun. 21, 2024, 10 pages.

(Continued)

*Primary Examiner* — Nimesh Patel
(74) *Attorney, Agent, or Firm* — Sage Patent Group

(57) ABSTRACT

A method performed by a network node is provided. The network node calculates a first Information Carrying Capacity (ICC) associated with a first layer. The first ICC is calculated based on beam weights calculated for the first layer, and an established channel estimate of the first layer. The first layer is selected to a set of layers.

The network node performs actions iteratively at least one time for layer selection, adds a subsequent layer, adapts the calculated beam weights to be used as subsequent beam weights for a subsequent layer, calculates a subsequent ICC for the subsequent layer, decides whether to select the added subsequent layer to the set of layers and rejecting the subsequent layer when the sum of the ICCs of the layers in the set of layers and the subsequent ICC is lower than the sum of ICCs of the layers in the set of layers.

13 Claims, 7 Drawing Sheets

(58) Field of Classification Search
CPC ..... H04L 5/0094; H04L 5/001; H04L 1/0031; H04L 1/0054; H04L 27/2601; H04L 5/0007; H04L 5/0098; H04L 49/205; H04L 5/0078; H04L 67/54; H04L 41/16; H04L 43/0876; H04L 41/145; H04L 41/12; H04L 43/0888; H04L 67/1012; H04L 41/147; H04L 41/40; H04L 45/08; H04L 47/10; H04L 47/12; H04L 47/125; H04L 47/2441; H04L 43/16; H04L 47/11; H04L 5/0051; H04L 1/0026; H04L 1/06; H04L 2025/03426; H04L 5/0035; H04L 1/0071; H04L 1/04; H04L 1/0618; H04L 45/125; H04L 63/10; H04L 5/023; H04B 7/0456; H04B 17/336; H04B 7/0617; H04B 7/0626; H04B 7/024; H04B 7/0413; H04B 7/0632; H04B 7/0697; H04B 7/088; H04B 7/0408; H04B 13/02; H04B 7/0695; H04B 7/06952; H04B 7/06966; H04B 7/0452; H04B 7/0639; H04B 7/0486; H04B 7/022; H04B 17/382; H04W 24/10; H04W 72/046; H04W 72/12; H04W 72/23; H04W 72/54; H04W 16/28; H04W 72/04; H04W 72/231; H04W 72/232; H04W 16/18; H04W 84/18; H04W 28/0268; H04W 28/18; H04W 40/04; H04W 52/0232; H04W 52/46; H04W 60/04; H04W 84/042; H04W 36/0005; H04W 28/16; H04W 36/0027; H04W 28/0289; H04W 28/06; H04W 72/20; H04W 28/10; H04W 72/51; H04W 72/30; H04W 72/52; H04W 74/0816; H04W 76/01; H04W 72/0446; H04W 72/0453; H04W 72/563; H04W 52/42; G06N 3/08; G06N 3/045; G06N 3/0464; G06N 20/00; G06N 3/04; G06N 3/044; G06N 3/094; G06N 3/0475; G06N 3/09; G06N 3/042; G06N 3/02; G06V 10/82; G06V 10/764; G06V 2201/07; G06V 20/58; G06V 10/25; G06V 10/774; G06V 10/765; G06T 2207/20084; G06T 2207/20081; G06T 9/002; G06T 7/73; H04J 13/00; H04J 13/0074; H04J 1/00; H04J 11/0026; H04J 2203/0091; H04J 2011/0003; H04J 3/1682; H04J 11/0053; Y02D 30/70

See application file for complete search history.

(56) References Cited

U.S. PATENT DOCUMENTS

| | | | | |
|---|---|---|---|---|
| 2020/0091986 A1* | 3/2020 | Huang | ................. | H04B 7/0452 |
| 2020/0099419 A1* | 3/2020 | El Chebib | ............ | H04B 7/0628 |
| 2020/0125930 A1* | 4/2020 | Martin | ................... | G06N 3/047 |
| 2020/0266863 A1* | 8/2020 | Muraoka | ................ | H04B 7/088 |
| 2020/0403673 A1* | 12/2020 | Bontu | .............. | H04L 25/03343 |
| 2021/0044457 A1* | 2/2021 | He | ....................... | H04J 11/0023 |

OTHER PUBLICATIONS

Hsin-Jui Chou et al., "Iterative Interference Alignment for Joint Degrees of Freedom and Sum Capacity Optimization," 2013 8th International Conference on Communications and Networking in China (CHINACOM), IEEE, Aug. 14, 2013, pp. 680-684.

International Search Report and Written Opinion of the International Searching Authority, PCT/SE2021/050493, mailed Jan. 27, 2022, 12 pages.

* cited by examiner

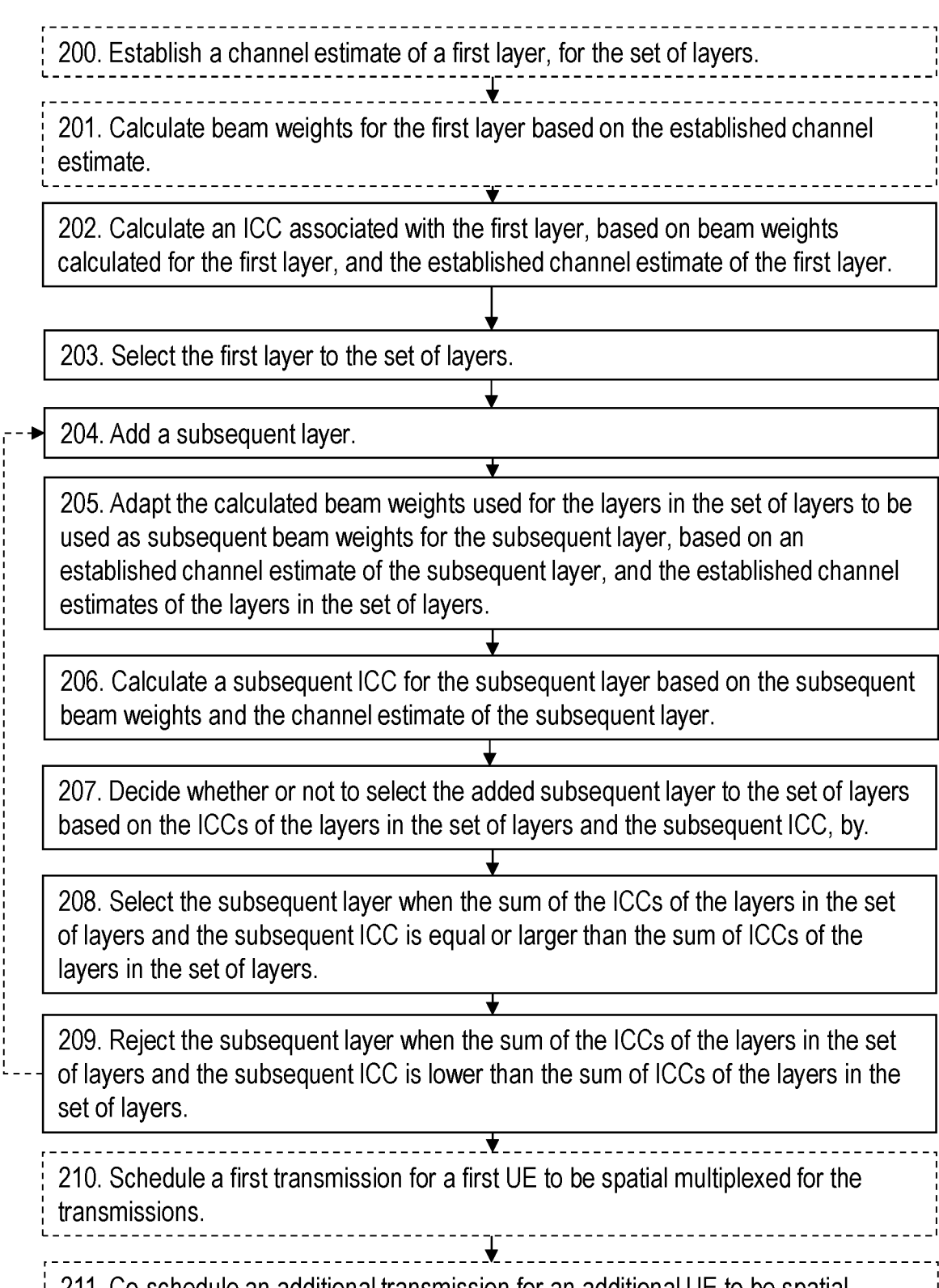

200. Establish a channel estimate of a first layer, for the set of layers.

201. Calculate beam weights for the first layer based on the established channel estimate.

202. Calculate an ICC associated with the first layer, based on beam weights calculated for the first layer, and the established channel estimate of the first layer.

203. Select the first layer to the set of layers.

204. Add a subsequent layer.

205. Adapt the calculated beam weights used for the layers in the set of layers to be used as subsequent beam weights for the subsequent layer, based on an established channel estimate of the subsequent layer, and the established channel estimates of the layers in the set of layers.

206. Calculate a subsequent ICC for the subsequent layer based on the subsequent beam weights and the channel estimate of the subsequent layer.

207. Decide whether or not to select the added subsequent layer to the set of layers based on the ICCs of the layers in the set of layers and the subsequent ICC, by.

208. Select the subsequent layer when the sum of the ICCs of the layers in the set of layers and the subsequent ICC is equal or larger than the sum of ICCs of the layers in the set of layers.

209. Reject the subsequent layer when the sum of the ICCs of the layers in the set of layers and the subsequent ICC is lower than the sum of ICCs of the layers in the set of layers.

210. Schedule a first transmission for a first UE to be spatial multiplexed for the transmissions.

211. Co-schedule an additional transmission for an additional UE to be spatial multiplexed for the transmissions.

Fig. 2

Computer program 380

Carrier 390

Memory 370

Processor 360

Input/Output Interface 300

Network node 110

Calculating Unit 302

Establishing Unit 301

Adding Unit 303

Adapting Unit 304

Deciding Unit 305

Selecting Unit 306

Rejecting Unit 307

Performing Unit 308

Scheduling Unit 310

Co-Scheduling Unit 311

Network node 110

METHOD AND NETWORK NODE CONFIGURED FOR SELECTION OF TRANSMISSION LAYERS

CROSS REFERENCE TO RELATED APPLICATIONS

This application is a 35 U.S.C. § 371 national stage application of PCT International Application No. PCT/SE2021/050493 filed on May 26, 2021, the disclosure and content of which is incorporated by reference herein in its entirety.

TECHNICAL FIELD

Embodiments herein relate to a network node and methods therein. In some aspects, they relate to selecting a layer for a set of layers for transmissions between the network node and at least one UE in a wireless communications network.

BACKGROUND

In a typical wireless communication network, wireless devices, also known as wireless communication devices, mobile stations, stations (STA) and/or User Equipment (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Frequency bands for 5G NR are being separated into two different frequency ranges, Frequency Range 1 (FR1) and Frequency Range 2 (FR2). FR1 comprises sub-6 GHz frequency bands. Some of these bands are bands traditionally used by legacy standards but have been extended to cover potential new spectrum offerings from 410 MHz to 7125 MHz. FR2 comprises frequency bands from 24.25 GHz to 52.6 GHZ. Bands in this millimeter wave range have shorter range but higher available bandwidth than bands in the FR1.

Multi-antenna techniques may significantly increase the data rates and reliability of a wireless communication system. For a wireless connection between a single user, such as UE, and a base station, the performance is in particular improved if both the transmitter and the receiver are equipped with multiple antennas, which results in a Multiple-Input Multiple-Output (MIMO) communication channel. This may be referred to as Single-User (SU)-MIMO. In the scenario where MIMO techniques is used for the wireless connection between multiple users and the base station, MIMO enables the users to communicate with the base station simultaneously using the same time-frequency resources by spatially separating the users, which increases further the cell capacity. This may be referred to as Multi-User (MU)-MIMO. Note that MU-MIMO may benefit when each UE only has one antenna. Such systems and/or related techniques are commonly referred to as MIMO.

In 4G and 5G, the introduction of Advanced Antenna Systems (AAS) on base stations has allowed for the possibility to perform beamforming and spatial multiplexing schemes with many more transmission layers than was previously possible in legacy antenna systems which uses only 2 or 4 antennas.

The wording transmission layer when used herein e.g. means a statistically independent stream of modulation symbols whose complete mapping onto an antenna array can be described by a beamforming vector, a corresponding mathematical definition is available in 3GPP specification 38.211

The wording user-layer when used herein e.g. means a transmission layer of the UE of interest.

In spatial multiplexing several data streams, also referred to as layers, are transmitted over independent channels that are spatially separated, e.g. by means of beamforming. The more parallel layers that can be sent at the same time, the more data can be passed over the air.

Beamforming when used herein e.g. means a technique which multiplexes a signal with different weights in frequency-domain at multiple antennas. The beamforming causes the signal energy to be sent to space according to a wanted beam pattern to form a directional beam to concentrate to certain direction or to form nulling to a certain direction, or the combination of two beamforming and spatial multiplexing. For each resource element, a beam weight, e.g. an amplitude and phase shift is added to each base station antenna element with the effect of creating a narrow-concentrated beam of energy from a base station antenna array towards the direction of a UE to which the base station is going to transmit data.

A Minimum Mean Square Estimator (MMSE) is a commonly used method for computation of the beam weights needed for spatial multiplexing and beamforming. The MMSE computes beam weights according to the equation: $W = H^H (HH^H + \sigma^2 I)^{-1}$.

The wording beam weights when used herein e.g. means a set of amplitude and phase shifts that when applied to the antenna elements of an antenna array with the purpose of generating constructive or destructive interference in the wavefront, e.g. beamforming.

The wording beam weight matrix when used herein e.g. means a matrix where each matrix element holds one beam weight each.

The variable W is the beamforming weight matrix, which has size A×L, where A is the number of base station antennas and L is the number of transmission layers. The variable H is the channel matrix of size L×A. Thus, each element in H comprises one antenna and one user-layer. In this way, the channel matrix H is built up of stacked row vectors, one row vector for each layer. Each row vector holds channel estimate samples for each base station antenna. There is one channel matrix for each subcarrier or group of subcarriers, thus there will be one corresponding beam weight computation for each subcarrier or group of subcarriers.

The wordings subcarrier or group of subcarriers when used herein e.g. mean one or several sub band(s) of a radio frequency carrier wave, which is modulated to send information The variable $\sigma^2$ is an estimate of the noise energy in the channel estimates which has the purpose to balance the amount of zero forcing and conjugate beamforming in the MMSE.

The channel matrix H may be measured, also referred to as estimated. This may involve a UE that first transmits a Sounding Reference Signal (SRS) from each one of its transmitter antennas. Then a base station uses this received reference signal to estimate the channel on each of its receiver antennas. This creates a picture of the channel properties between the UE and base station antennas which is captured by the channel matrix H.

SUMMARY

As a part of developing embodiments herein a problem was identified by the inventors and will first be discussed.

A problem with spatial multiplexing transmission layers is to understand a given set of UEs, and their respective channel properties. An exact calculation of the channel properties would require a base station to go through all layer and UE combinations and evaluate the implication of spatially multiplexing them, which is quite cumbersome.

An object of embodiments herein is to improve the performance of a wireless communications network using transmission layers.

According to an aspect of embodiments herein, the object is achieved by a method performed by a network node for selecting a layer for a set of layers for transmissions between the network node and at least one UE in a wireless communications network. The layers in the set of layers are to be spatial multiplexed for the transmissions. The network node calculates a first ICC associated with a first layer. The first ICC is calculated based on calculated beam weights for the first layer, and an established channel estimate of the first layer. The network node selects the first layer to the set of layers.

The network node performs the following actions iteratively at least one time for layer selection. The network node adds a subsequent layer for the transmissions. The network node adapts the calculated beam weights used for the layers in the set of layers to be used as subsequent beam weights for the subsequent layer, based on an established channel estimate of the subsequent layer, and the established channel estimates of the layers in the set of layers. The network node calculates a subsequent ICC for the subsequent layer, based on the subsequent beam weights and the channel estimate of the subsequent layer. The network node decides whether or not to select the added subsequent layer to the set of layers based on the ICCs of the layers in the set of layers and the subsequent ICC, by selecting the subsequent layer when the sum of the ICCs of the layers in the set of layers and the subsequent ICC is equal or larger than the sum of ICCs of the layers in the set of layers, and rejecting the subsequent layer when the sum of the ICCs of the layers in the set of layers and the subsequent ICC is lower than the sum of ICCs of the layers in the set of layers.

According to another aspect of embodiments herein, the object is achieved by a network node configured to select a layer for a set of layers for transmissions between the network node and at least one UE in a wireless communications network. The layers in the set of layers are to be spatial multiplexed for the transmissions. The network node further being configured to:

calculate a first ICC associated with a first layer, which first ICC is adapted to be calculated based on beam weights calculated for the first layer, and an established channel estimate of the first layer, select the first layer to the set of layers, and perform the following actions iteratively at least one time for layer selection:

Add a subsequent layer for the transmissions, adapt the calculated beam weights used for the layers in the set of layers to be used as subsequent beam weights for the subsequent layer, based on an established channel estimate of the subsequent layer, and the established channel estimates of the layers in the set of layers, calculate a subsequent ICC for the subsequent layer, based on the subsequent beam weights and the channel estimate of the subsequent layer, and decide whether or not to select the added subsequent layer to the set of layers based on the ICCs of the layers in the set of layers and the subsequent ICC, by selecting the subsequent layer when the sum of the ICCs of the layers in the set of layers and the subsequent ICC is equal or larger than the sum of ICCs of the layers in the set of layers, and rejecting the subsequent layer when the sum of the ICCs of the layers in the set of layers and the subsequent ICC is lower than the sum of ICCs of the layers in the set of layers.

The actions for layer selection are performed repeatedly, by adding one subsequent layer at a time. If adding a subsequent layer increases the total ICC the layer is kept. If the total ICC is not increased the layer is rejected and another subsequent layer is then evaluated instead. The beam weight calculations that are needed for the ICC computations are updated in an iterative manner. In each new iteration the beam weights do not have to be recomputed from scratch, instead the beam weights computations from the previous iteration are updated efficiently in a manner that will only require a fraction of the cost compared to a full calculation of the beam weights. This results in an improved performance of a wireless communications network using a set of transmission layers.

BRIEF DESCRIPTION OF THE DRAWINGS

Examples of embodiments herein are described in more detail with reference to attached drawings in which:

FIG. 2 is a flowchart depicting an embodiment of a method in a network node.

DETAILED DESCRIPTION

Figure 1:
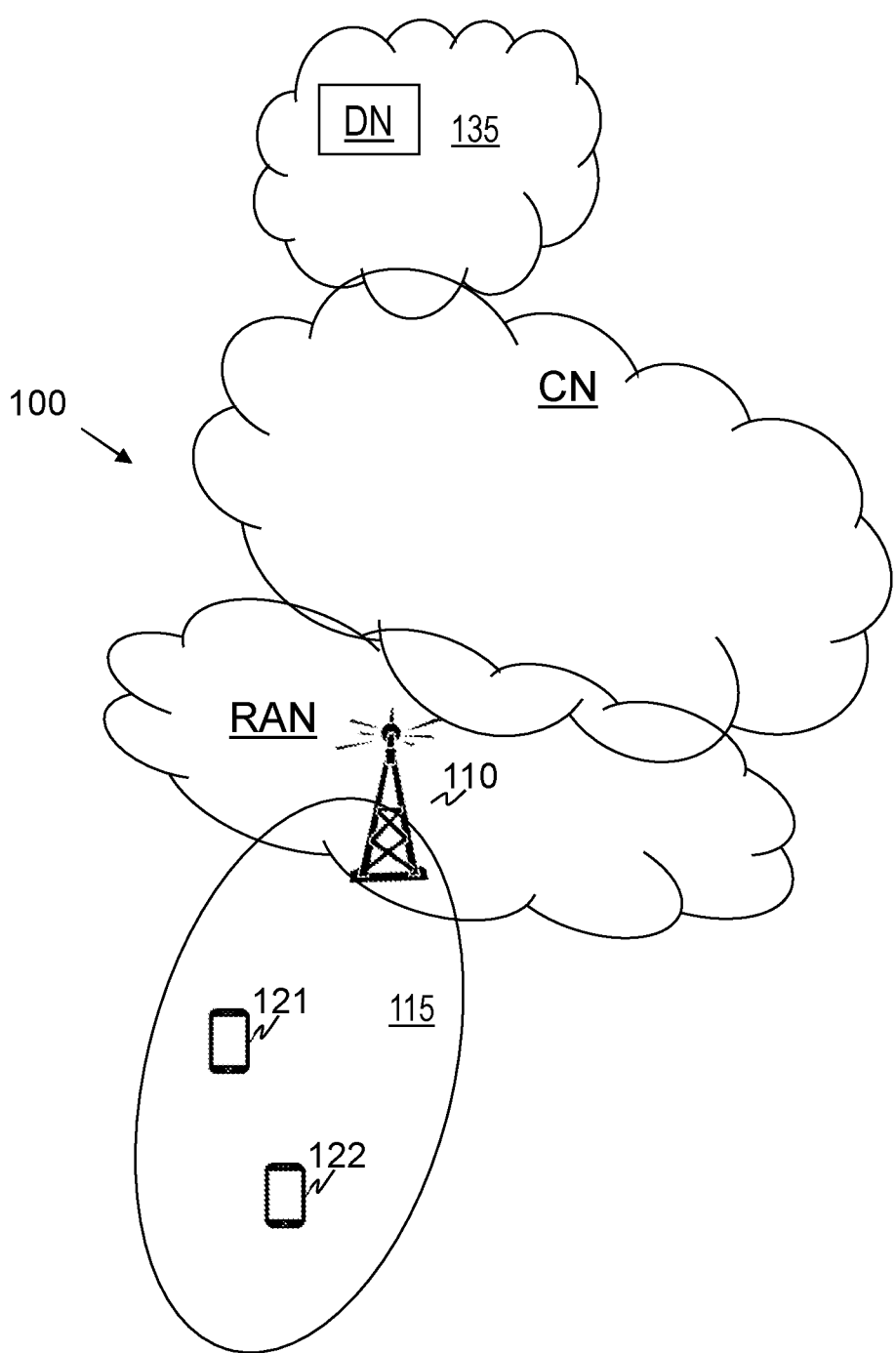
FIG. 1 is a schematic block diagram illustrating embodiments of a wireless communications network.

As a part of developing embodiments herein a problem was identified by the inventors which will be further discussed below.

A core problem with spatial multiplexing is to understand a given a set of UEs, also referred to as users, and their respective channel properties. E.g., how many transmission layers from each UE shall be multiplexed in any given Transmission Time Interval (TTI) on each physical resource block.

A common way to handle this problem is to measure the spatial correlation between the transmission layers via the use of an orthogonality factor.

The wording spatial correlation when used herein e.g. means a correlation between the spatial directions between two transmission layers.

The wording orthogonality factor when used herein e.g. means a measurement that indicates how spatial correlated, non-orthogonal, or uncorrelated, orthogonal, two transmission layers are.

If the transmission layers or UEs are considered being sufficiently orthogonal, spatial multiplexing of the involved transmission layers or UEs are allowed. It is also important that the transmission layers and UEs have a similar Signal to Interference and Noise Ratio (SINR) since a weaker layer would otherwise have to borrow energy from a stronger layer which would degrade the throughput on the transmission layer with the best channel quality. On the other hand, it is challenging to determine the impact of the orthogonality factor because the orthogonality does not directly translate to SINR or spectrum efficiency. A common approach to quantify the impact is to estimate SINR penalties for different orthogonalities. However, such estimation is difficult to be accurate. Besides, any change in the transmission layer selection affects the penalty. Inaccurate SINR will inevitably cause performance loss.

A fundamental problem of using criteria of this kind is that they are based on heuristics rather than exact calculations.

An exact calculation would require the base station to go through all layer and UE combinations and evaluate the implication of spatially multiplexing them. Each evaluation would require calculation of beamforming weights for each multiplexed layer and UE. The beam weights and the corresponding channel estimates may be used together with an interference estimate to predict the channel quality and the Information Carrying Capacity (ICC). The channel quality is related to the ICC by a function, e.g. ICC=f(channel quality). The hypothesis with the highest ICC is the layer and user combination that provides the highest spectral efficiency. The word hypothesis when used herein e.g. means a set of users and layers. An exact approach like the one described above would require a lot of computations.

Example embodiments herein relate to an iterative layer and e.g. UE selection for co-scheduling.

Example embodiments herein provide an algorithm that replaces the previously used heuristics approach with a method that uses exact calculations but in a more efficient manner. The wording exact calculation when used herein e.g. means that the calculated output, e.g. the beam weights and channel quality estimates will be identical to the heuristic method. The provided method is iterative and capable of selecting an appropriate number of transmission layers for spatial multiplexing via exact calculations.

To overcome the need of going through all combinatorial layer and user combinations for spatial multiplexing, embodiments herein add and evaluates one layer at a time. If adding a subsequent layer to a first layer increases the total ICC of the first and subsequent layer, the subsequent layer is selected, i.e. is kept. If the total ICC is not increased the subsequent layer is rejected and another subsequent layer, is evaluated instead. The beam weight calculations that are needed for the ICC computations are updated in an iterative manner. In each new iteration the beam weights do not have to be recomputed from scratch, instead the beam weights computations from the previous iteration are updated efficiently in a manner that will only require a fraction of the cost compared to a full calculation of the beam weights.

Examples of the provided embodiments relies on an ICC concept which is based on information theory. This provides a very accurate decision result when choosing layers and UEs to multiplex spatially. Further, the provided use of the approach of evaluating one layer at a time allows for the use of a computational efficiency for updating the otherwise computationally expensive beam weight computations.

When these approaches, e.g. the iterative weight computations and the add one layer at a time, are combined the result is a computational efficient method for solving the problem of layer and user selection for spatial multiplexing. The combined complexity of calculating the beam weights from a single layer up to the maximum number of layers according to prior art, may equal the number of cycles required to make one (non-iterative) computation with the maximum number of layers according to embodiments herein.

Embodiments herein are able to provide accurate SINR to the scheduler as it selects UEs. This is since the beam weight matrix $W_j$ $W_j$ of one transmission layer, j, when projected to the channel matrix $H_i$ of transmission layer, i, provides the effective channel, $H_{eff}(i,j)=H_{eff}^{i,j}=H_i$ $W_j$ The matrix $H_{eff}(i,j)$ holds information of how much of the energy that is beamformed towards user j that will reach the UE antennas of user i. The SINR for user i can now be calculated as $$SNR^i = tr\left\{H_{eff}^{i,i}{}^H H_{eff}^{i,i}\left(\sum_{j\neq i} H_{eff}^{i,j}{}^H H_{eff}^{i,j} + I\sigma_i^2\right)^{-1}\right\}.$$

Tr{x} is the trace of matrix "x", I is an identity matrix and $\sigma_i^2$ is the UE noise power of user i. With a setup of this kind both the constructive and destructive interference as well as the noise power level of user i is taken into account into the channel quality measurement (SINR).

If a UE at the end of the iteration is not selected for transmission, the exact SINR and ICC for the rest of the co-scheduled UEs are already computed and available to the scheduler. No recalculation or adjustment is needed.

A nice sequel of the iterative layer selection is that it inherently will produce beam weights as an output from each iteration. To compute the beam weights from all hypotheses, e.g. from a single layer up to the maximum number of layers with a non-iterative method would require a very complex re-computation of the full beam weight computation for every new iteration.

FIG. 1 is a schematic overview depicting a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g. a network node 110. The network node 110 provides radio coverage in a cell which may also be referred to as a beam or a beam group of beams, such as a cell 115 provided by the network node 110.

The network node 110, may be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with UEs 121, 122 within the service area served by the network node 110 depending e.g. on the first radio access technology and terminology used. The radio network node 110 may communicate with UEs 121, 122, in Downlink (DL) transmissions to the UEs 121, 122 and Uplink (UL) transmissions from the UEs 121, 122.

A number of UEs operate in the wireless communication network 100, such as e.g. the UEs 121, 122. These are referred to as a first UE 121 and an additional UE 122 herein. Each of the UEs 121, 122 may also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by the network node 110. As an alternative, a Distributed Node (DN) and functionality, e.g. comprised in a cloud 135 as shown in FIG. 1, may be used for performing or partly performing the methods herein.

Example embodiments may provide a computationally efficient way of finding a good transmission layer and UE 121, 122 pairing combinations in the sense that ICC of an evaluated hypothesis is maximized.

A number of embodiments will now be described, some of which may be seen as alternatives, while some may be used in combination.

FIG. 2 shows example embodiments of a method performed by the network node 110 for selecting a layer for a set of layers for transmissions between the network node 110 and at least one UE 121, 122 in the wireless communications network 100. The layers in the set of layers are to be spatial multiplexed for the transmissions.

The method comprises the following actions, which actions may be taken in any suitable order. Optional actions are referred to as dashed boxes in FIG. 2.

According to an example scenario, the method starts with adding, evaluating, and selecting a first layer for the set of layers to be used for the transmissions, in Actions 200-203. Then subsequent layers are added evaluated and possibly selected, one by one in an iterative manner according to Actions 204-209.

Action 200

The network node 110 may establish a channel estimate of the first layer. The channel estimate may be represented by a first ICC estimate of the first layer, for the transmissions. In this context ICC may be an information measurement that is a function of SINR, a modulation mapping scheme and a desired block error rate after channel decoding, e.g. ICC=f (SINR,modulation_scheme,target_BLER).

Action 201

The network node 110 may calculate the beam weights for the first layer based on the established channel estimate. This may be to get a channel quality SINR of the first layer, where the SINR may be calculated by using the established channel estimate, the calculated beam weights and a noise and interference estimate from the UE 120.

Action 202

The network node 110 calculates a first ICC associated with the first layer. The first ICC is calculated based on beam weights calculated for the first layer, and the established channel estimate of the first layer.

Action 203

The network node 110 selects the first layer to the set of layers. This may be based on the first ICC, e.g., based on that the first ICC is acceptable.

The network node 110 then performs the following Actions 204-209 iteratively at least one time for layer selection, indicated by the dotted arrow in FIG. 2.

The actions for layer selection 204-209 may be performed iteratively until any one out of:
there are no more available layers add, or
the number of selected layers exceed a first threshold, or
the allowed number of repeating the actions for layer selection 204-209 exceeds a second threshold.

Action 204

The network node 110 adds a subsequent layer. The added subsequent layer may be referred to as a candidate to the set of layers. This subsequent layer may e.g. be chosen by using a selection scheme, e.g. Round Robin, or random selection, or some other method, which is used to determine which of the not yet selected layer(s) from either the same UE 120 or from another UE shall be selected

Action 205

The network node 110 adapts the calculated beam weights used for the layers in the set of layers to be used as subsequent beam weights for the subsequent layer, based on an established channel estimate of the subsequent layer, and the established channel estimates of the layers in the set of layers.

In some embodiments, a SINR of a layer the set of layers is a function of the channel estimate the first layer, and a subsequent SINR is a function of the channel estimate of the subsequent layer.

The SINR for each selected and subsequent layer, may first be calculated and mapped to a corresponding ICC for each layer. E.g. via ICC being a function of SINR, modulation scheme and target BLER, ICC=f(SINR,modulation_scheme,target_BLER). The ICC for each selected and subsequent layer may then be summed together into the total ICC.

According to the example scenario, in each new iteration the beam weights do not have to be recomputed from scratch, instead the beam weights computations associated with the latest selected layer are adjusted, also referred to as updated, efficiently in a manner that will only require a fraction of the cost compared to a full calculation of the beam weights.

The adapting of the calculated beam weights, may further is based on updating any one or more out of:

a calculation of a channel covariance matrix such as $\tilde{H}\tilde{H}^H$, a regularization of a channel covariance matrix such as $\tilde{H}\tilde{H}^H$, and an inversion of a regularized channel covariance matrix such as $\tilde{H}\tilde{H}^H$.

Further options are a combing of conjugate beamforming and zero-forcing parts" and the other computational steps described in the "SINR and beam weights calculation" section below.

Action 206

The network node 110 then calculates a subsequent ICC for the subsequent layer based on the subsequent beam weights and the channel estimate of the subsequent layer. This will be explained more in detail below.

Action 207

The network node 110 decides whether or not to select the added subsequent layer to the set of layers based on the ICCs of the layers in the set of layers and the subsequent ICC. This is performed according to Action 208 or Action 209 below.

According to the example scenario, if adding a subsequent layer increases the total ICC the layer is selected, also referred to as kept (Action 208). If the total ICC is not increased the layer is rejected (Action 209) and another subsequent layer is then evaluated instead.

Action 208

The network node 110 selects the subsequent layer when the sum of the ICCs of the layers in the set of layers and the subsequent ICC is equal or larger than the sum of ICCs of the layers in the set of layers. Thus, e.g., if adding a subsequent layer increases the total ICC, the layer is selected, also referred to as kept.

Action 209

The network node 110 rejects the subsequent layer when the sum of the ICCs of the layers in the set of layers and the subsequent ICC is lower than the sum of ICCs of the layers in the set of layers. Thus, e.g., if the total ICC is not increased the layer is rejected.

According to an example scenario, for the respective selected layers transmissions will be scheduled to be spatial multiplexed.

Action 210

In some embodiments, the first UE 121 is associated with the selected first layer. In some of these embodiments, the network node 110 schedules a first transmission for the first UE 121 to be spatial multiplexed for the transmissions. The scheduling is based on the channel estimate of the first layer.

Action 211

In some embodiments, one or more additional UE 122 is associated with a respective selected subsequent layer. In some of these embodiments, for each subsequent layer that has been selected, the network node 110 co-schedules an additional transmission for the respective additional UE 122 to be spatial multiplexed for the transmissions. The co-scheduling is based on the channel estimate of the subsequent layer.

The above embodiments will now be further explained and exemplified below. The embodiments below may be combined with any suitable embodiment above.

Below, an example scenario is described more in detail:

One suitable metric for measuring the channel quality is the SINR experienced by each user on its corresponding transmission layers. A channel quality is used in above mentioned Actions 201 and 205, for adapting the calculated beam weights for the first layer to be used as subsequent beam weights for the subsequent layer, based on an established channel estimate of the subsequent layer, and the established channel estimate of the first layer.

A channel quality is further used in above mentioned Action 201 and 206 for calculating a subsequent ICC for the subsequent layer, based on the channel estimate of the subsequent layer.

As mentioned above, the channel estimate may be represented by an SINR.

This means that to achieve the channel estimate, an SINR may be computed.

The first step in the SINR computation is to project a beamforming weight matrix on to a channel matrix to obtain an effective channel. This produces the view of the channel from the UE's 121, 122 point of view in the DL, or the post-equalized channel of an UL reception in the view of the network node 110. The projection, $H_{eff}$=HW=HH$^H$(HH$^H$+ $\sigma^2$I)$^{-1}$, is referred to as the effective channel.

In the downlink matrix $H_{eff}$ comprises information of how much of the desired energy from each transmission layer that will be received on each UE 121, 122 antenna and how much interference is leaking between the transmission layers, either within the same UE 121, 122 or between other co-scheduled UE's 121, 122.

The effective channel may be used to compute the SINR. There are many formulas to compute the SINR, one simple form is to calculate the SINR of a layer I as:

$$\text{SIN}R(l) = \frac{|H_{eff}(l,\,l)|^2}{\sigma_l^2},$$

where $\sigma_l^2$ is the noise energy of the layer, either in the UE 121, 122, or in the UL receiver of the network node 110.

In DL, the noise energy of the layer $\sigma_l^2$ may be extracted by the network node 110 from a Channel Quality Information (CQI) report received from the UE 121, 122.

The SINR for each layer is then mapped to a corresponding ICC for each layer. This is a simple function mapping, e.g. $ICC_{L+1}(l)=f(SINR(l))$. The ICC domain is convenient to use as information can be added linearly while SINR measurements cannot t As described above in Action 207, the network node 110 then decides whether or not to select the added subsequent layer for the transmissions based on the first ICC and the subsequent ICC.

The network node 110, selects the subsequent layer when the sum of first ICC and the subsequent ICC is equal or larger than the first ICC as mentioned in Action 208, and rejects the subsequent layer when the sum of first ICC and the subsequent ICC is lower than the first ICC, as mentioned in Action 209.

This may be performed according to the following: If $$\sum_{l=1}^{L+1} ICC_{L+1}(l) > \sum_{l=1}^{L} ICC_L(l)$$

the latest added subsequent layer is selected, also referred to as kept, otherwise the latest added subsequent layer is removed and a transmission from another transmission layer is added and evaluated according to the described procedure. The procedure may continue until either the maximum number of stacked layers have been reached or if the maximum allowed number of layer pairing attempts have been exhausted.

SINR and Beam Weights Calculation

It will now be described how the DL or UL SINR and the beam weights may be efficiently calculated in an iterative manner with the purpose of choosing good transmission layer and user pairing UE 121, 122 candidates for co-scheduling.

The MMSE formulation for direct computation of beam weights is: $W=H^H(HH^H+\sigma^2 I)^{-1}$ Lets' start breaking up the different parts of the beam weight computation for the MMSE:

Calculation of Covariance Matrix $\tilde{H}\tilde{H}^H$

To start with, the matrix multiplication: $HH^H$ in the MMSE formula, which is also referred to as the channel covariance matrix will be described. A subsequent layer shall be added to the channel matrix H relating to the established layers. Thus, a row vector $\vec{h}$, of size 1×A, for the subsequent layer is added to H. This may be described mathematically as $$\tilde{H} = \begin{bmatrix} \vec{h} \\ H \end{bmatrix}_{L+1 \times A}.$$

wherein $\tilde{H}$ is the stacked channel matrix that holds channel estimate samples of all antennas of the established and subsequent layer(s)

To begin with, $$\tilde{H}\tilde{H}^H = \begin{bmatrix} \vec{h} \\ H \end{bmatrix}\begin{bmatrix} \vec{h} \\ H \end{bmatrix}^H = \begin{bmatrix} \vec{h}\vec{h}^H & \vec{h}H^H \\ H\vec{h}^H & HH^H \end{bmatrix}_{L+1 \times L+1}$$

is calculated.

It turns out that the lower right portion of matrix $\tilde{H}\tilde{H}^H$ comprises the already computed matrix $HH^H$, it is only needed to copy the elements in $HH^H$ to their correct position in $\tilde{H}\tilde{H}^H$. Copying is typically a very cheap operation on modern computers or DSPs. The upper left most element in matrix $\tilde{H}\tilde{H}^H$ requires the computation of $\vec{h}\vec{h}^H$, this operation corresponds to a vector dot product and requires as many multiplications as the length of vector $\vec{h}$, e.g. there are "A" number of multiplications needed. The vector $\vec{h}H^H$ is the conjugate transpose of vector $H\vec{h}^H$, e.g. they are Hermitian symmetric. Because of the symmetry the computation of $\vec{h}H^H$ alone is sufficient. This computation requires the multiplication of a vector of size 1×A with a matrix of size A×L. Thus, A×L multiplications are needed. The cycles required are only fraction of the $0.5\ L^3$ cycles required for a full matrix computation.

Regularization of Covariance Matrix $\tilde{H}\tilde{H}^H$

The $\tilde{H}\tilde{H}^H$ will then be regularized. Regularization here implies adding an identity matrix that is scaled by a regularization factor to the channel covariance matrix, e.g. $HH^H+\sigma^2 I$. This relates to Action 205.

This means that a regularization $\sigma^2$ part shall be added to $\tilde{H}\tilde{H}^H$. This step only requires addition operation to the upper left most element, according to:

$$\tilde{H}\tilde{H}^H + \sigma^2 I_{L+1 \times L+1} = \begin{bmatrix} \vec{h}\vec{h}^H + \sigma^2 & \vec{h}H^H \\ H\vec{h}^H & HH^H + I_{L \times L}\sigma^2 \end{bmatrix}_{L+1 \times L+1}$$

As in the iterative calculation of the channel covariance matrix $\tilde{H}\tilde{H}^H$ it turns out that the lower right portion of matrix $\tilde{H}\tilde{H}^H+\sigma^2 I_{L+1 \times L+1}$ comprises the already computed matrix $HH^H+I_{L \times L}\sigma^2$. Thus, the cycle efficiency principles that was described in the calculation of the channel covariance matrix $\tilde{H}\tilde{H}^H$ also applies to the regularization step.

Inversion of Regularized Covariance Matrix $\tilde{H}\tilde{H}^H$

The regularization of $\tilde{H}\tilde{H}^H$ will then be inversed. This step corresponds to the $(HH^H+\sigma^2 I)^{-1}$ part of the MMSE formula. This relates to Action 205.

The inverse calculation, e.g. $(HH^H+\sigma^2 I)^{-1}$, will now be expressed in the form of an iterative rule where the inverse $A_L^{-1}$ of the established layers are used as inputs together with the regularization factor $\sigma^2$, the channel estimates, $\vec{h}$, of the subsequent layer and the channel matrix, H, of the established layers:

Please refer to the inverse of the previous iteration as $A_L^{-1}$. To make the notation more compact the elements in $\tilde{H}\tilde{H}^H+\sigma^2 I_{L+1 \times L+1}$ are renamed as $$\begin{bmatrix} \vec{h}\vec{h}^H + \sigma^2 & \vec{h}H^H \\ H\vec{h}^H & HH^H + I_{L \times L}\sigma^2 \end{bmatrix}_{L+1 \times L+1} = \begin{bmatrix} b & \vec{d} \\ \vec{d}^H & A_{L \times L} \end{bmatrix}_{L+1 \times L+1}$$

where, $d=\vec{h}\vec{h}^H+\sigma^2$, $\vec{b}=\vec{h}H^H$ and $A_{L \times L}=HH^H+I_{L \times L}\sigma^2$ The inversion of matrix $A_{L+1 \times L+1}$ may then be described as:

$$A_{L+1 \times L+1}^{-1} = \begin{bmatrix} d & \vec{b} \\ \vec{b}^H & A_L \end{bmatrix}^{-1} = \begin{bmatrix} \dfrac{1}{k} & -\dfrac{1}{k}\vec{l} \\ -\dfrac{1}{k}\vec{l}^H & A_L^{-1} + \dfrac{\vec{l}\,\vec{l}^H}{k} \end{bmatrix},$$

where $\vec{l}=A_L^{-1} \cdot \vec{b}^H$ and $k=d-\vec{b} \cdot \vec{l}$.

The calculation of $\vec{l}$ requires $L^2 - 0.5\,L$ multiplications. The calculation of $\vec{b} \cdot \vec{l}$ requires $0.5\,L$ multiplications. Thus, the total complexity is $L^2$ multiplications. For efficiency reasons the computation of $\vec{l}\,\vec{l}^H$ shall not be performed in this step, instead the computation of $\vec{l}\,\vec{l}^H$ is incorporated in the final beam weight computation.

Combing of the Conjugate Beamforming and Zero-Forcing Parts

To finalize the beam weight computation, matrix W is derived by multiplying the conjugate beamforming matrix $H^H$ with a zero-forcing matrix $(HH^H + \sigma^2 I)^{-1}$. That is $$W_{L+1} = H^H \left(HH^H + \sigma^2 I\right)^{-1} = \begin{bmatrix} \vec{h} \\ H \end{bmatrix}^H \begin{bmatrix} \dfrac{1}{k} & -\dfrac{1}{k}\vec{l} \\ -\dfrac{1}{k}\vec{l}^H & A_L^{-1} + \dfrac{\vec{l}\,\vec{l}^H}{k} \end{bmatrix} =$$

$$\left[\vec{h}^H \dfrac{1}{k} - H^H \vec{l}^H \dfrac{1}{k} \quad -\vec{h}^H \vec{l}\dfrac{1}{k} + H^H A_L^{-1} + \left(H^H \vec{l}\right)\vec{l}^H \dfrac{1}{k}\right]$$

We first note that the weight matrix of the previous iteration is: $W_L = H^H A_L^{-1}$. Thus, $$W_{L+1} = \left[\vec{h}^H \dfrac{1}{k} - H^H \vec{l}^H \dfrac{1}{k} \quad -\vec{h}^H \vec{l}\dfrac{1}{k} + W_L + \left(H^H \vec{l}\right)\vec{l}^H \dfrac{1}{k}\right]$$

Each one of the computations: $H^H \vec{l}^H$, $\vec{h}^H \vec{l}$, $H^H \vec{l}$ and $(H^H \vec{l})\vec{l}^H$ requires $A * L$ multiplications Making the total number of multiplications needed for updating the beam weight matrix for one iteration $4 * A * L + L^2$ multiplications.

Weight Normalization

At this point in the algorithm a method for normalizing the energy of the beam weights maybe applied. This normalization determines how the available transmission power shall be distributed between the co-scheduled transmission layers. This is optional and not a requirement for the following steps in the SINR and beam weight computation algorithm.

Computation of the Effective Channel

The next step in the SINR computation is to calculate the effective channel of the I:th transmission layer, that is an added subsequent layer, $H_{eff}(l,l)$. Variable $H_{eff}(l,l)$ is equal to a vector dot product between the I:th row of H and the I:th column of W. This operation will require "A" multiplications. "A" multiplications means "A" number of complex valued multiplications.

Final SINR Formula

The SINR for each transmission layer, such as the first layer and one or more subsequent layers, may now be calculated as:

$$SINR(l) = \frac{|H_{eff}(l,l)|^2}{\sigma_l^2}$$

To perform the method actions above, the network node 110 is configured to select a layer for a set of layers for transmissions between the network node 110 and at least one UE 121, 122 in the wireless communications network 100. The layers in the set of layers are to be spatial multiplexed for the transmissions. The network node 110 may comprise an arrangement depicted in FIGS. 3a and 3b.

The network node 110 may comprise an input and output interface 300 configured to communicate with UEs such as the UE 121 and the UE 122. The input and output interface 300 may comprise a wireless receiver (not shown) and a wireless transmitter (not shown).

The network node 110 may further be configured to, e.g. by means of an establishing unit 301 in the network node 110, establish a channel estimate of a first layer.

The network node 110 may further be configured to, e.g. by means of a calculating unit 302 in the network node 110, calculate a first ICC associated with a first layer. The first ICC is adapted to be calculated based on beam weights calculated for the first layer, and an established channel estimate of the first layer.

The network node 110 may further be configured to, e.g. by means of the calculating unit 302 in the network node 110, calculate a subsequent ICC for the subsequent layer, based on the subsequent beam weights and the channel estimate of the subsequent layer.

The network node 110 may further be configured to, e.g. by means of the calculating unit 302 in the network node 110, calculate the beam weights for the first layer based on the established channel estimate.

The network node 110 may further be configured to, e.g. by means of an adding unit 303 in the network node 110, add a subsequent layer for the transmissions.

The network node 110 may further be configured to, e.g. by means of the adding unit 303 in the network node 110, The network node 110 may further be configured to, e.g. by means of an adapting unit 304 in the network node 110, adapt the calculated beam weights used for the layers in the set of layers to be used as subsequent beam weights for the subsequent layer, based on an established channel estimate of the subsequent layer, and the established channel estimates of the layers in the set of layers.

The network node 110 may further be configured to, e.g. by means of the adapting unit 304 in the network node 110, adapt the calculated beam weights, further based on updating any one or more out of:

a calculation of a channel covariance matrix,
a regularization of a channel covariance matrix, and
an inversion of a regularized channel covariance matrix.

The network node 110 may further be configured to, e.g. by means of a deciding unit 305 in the network node 110, decide whether or not to select the added subsequent layer to the set of layers based on the ICCs of the layers in the set of layers and the subsequent ICC.

The network node 110 may further be configured to, e.g. by means of a selecting unit 306 in the network node 110, select the subsequent layer when the sum of the ICCs of the layers in the set of layers and the subsequent ICC is equal or larger than the sum of ICCs of the layers in the set of layers.

The network node 110 may further be configured to, e.g. by means of a rejecting unit 307 in the network node 110, reject the subsequent layer when the sum of the ICCs of the layers in the set of layers and the subsequent ICC is lower than the sum of ICCs of the layers in the set of layers.

The network node 110 may further be configured to, e.g. by means of a performing unit 308 in the network node 110, perform the actions iteratively at least one time for layer selection. The actions may be adding, adapting, calculating, deciding, selecting, and rejecting, e.g. as in actions 204-209 above.

The network node 110 may further be configured to, e.g. by means of the performing unit 308 in the network node 110, perform the actions for layer selection iteratively until any one out of:

there are no more available layers to add, or the number of selected layers exceed a first threshold, or the allowed number of repeating the actions for the layer selection exceeds a second threshold.

In some embodiments, a first UE 121 is associated with the first layer, and one or more additional UE (122) is associated with a respective selected subsequent layer.

In some of these embodiments, the network node 110 may further be configured to, e.g. by means of a scheduling unit 310 in the network node 110, based on the channel estimate of the first layer, schedule a first transmission for the first UE 121 to be spatial multiplexed for the transmissions, and for each subsequent layer that has been selected.

In some of these embodiments, the network node 110 may further be configured to, e.g. by means of a co-scheduling unit 311 in the network node 110, based on the channel estimate of the subsequent layer co-schedule an additional transmission for the additional UE 122 to be spatial multiplexed for the transmissions.

In some embodiments, the channel estimate of the first layer is represented by a first SINR and the channel estimate of the subsequent layer is represented by a subsequent SINR.

Figure 3A:
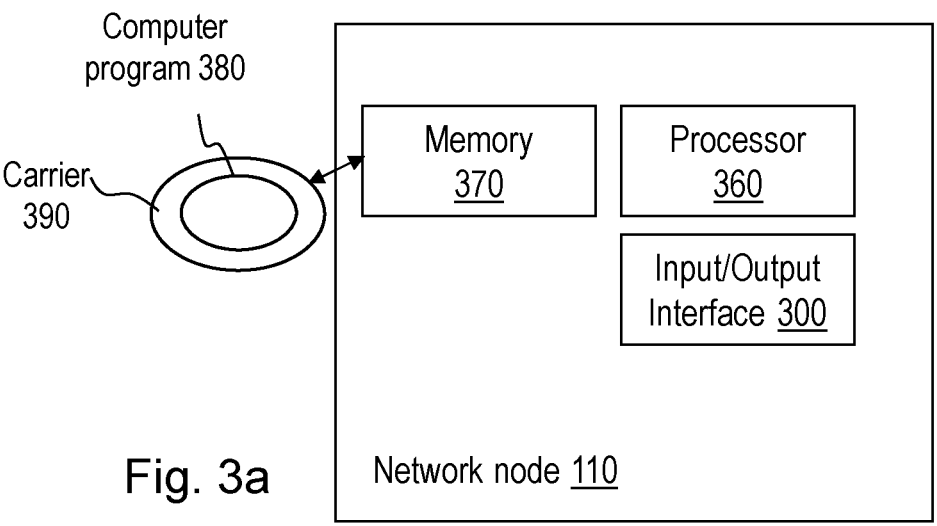
FIG. 3a-b are schematic block diagrams illustrating embodiments of a function node.
Figure 3B:
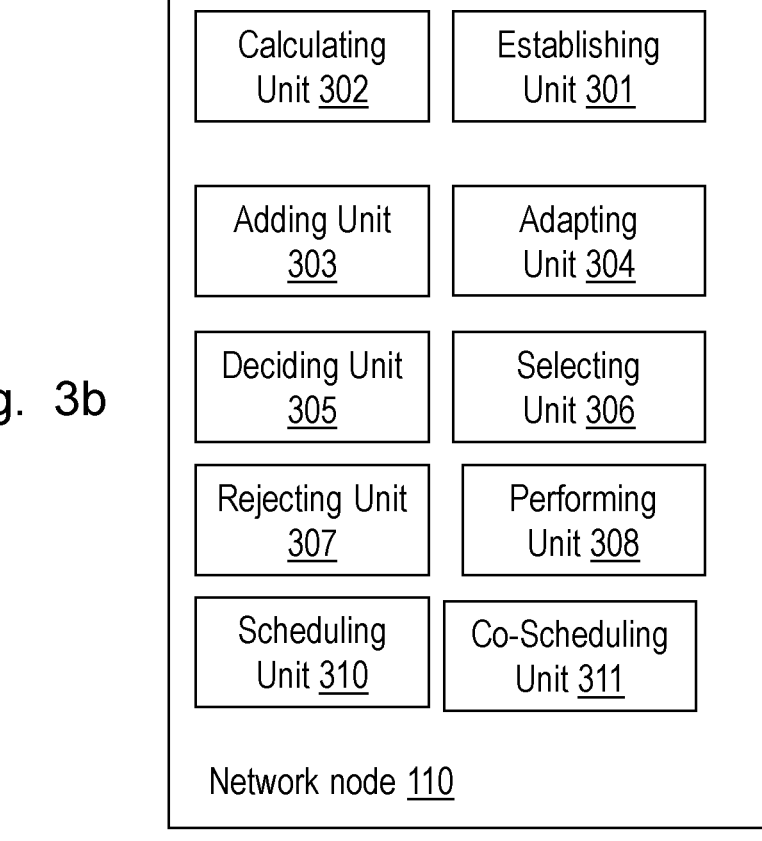

The embodiments herein may be implemented through a respective processor or one or more processors, such as the processor 360 of a processing circuitry in the network node 110 depicted in FIG. 3a, together with respective computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 370 comprising one or more memory units. The memory 370 comprises instructions executable by the processor in network node 110. The memory 370 is arranged to be used to store e.g. information, indications, data, configurations, and applications to perform the methods herein when being executed in the network node 110.

In some embodiments, a computer program 380 comprises instructions, which when executed by the respective at least one processor 360, cause the at least one processor of the network node 110 to perform the actions above.

In some embodiments, a respective carrier 390 comprises the respective computer program 380, wherein the carrier 390 is one of an electronic signal, an optical signal, an electromagnetic signal, a magnetic signal, an electric signal, a radio signal, a microwave signal, or a computer-readable storage medium.

Those skilled in the art will appreciate that the units in the network node 110 described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 4:
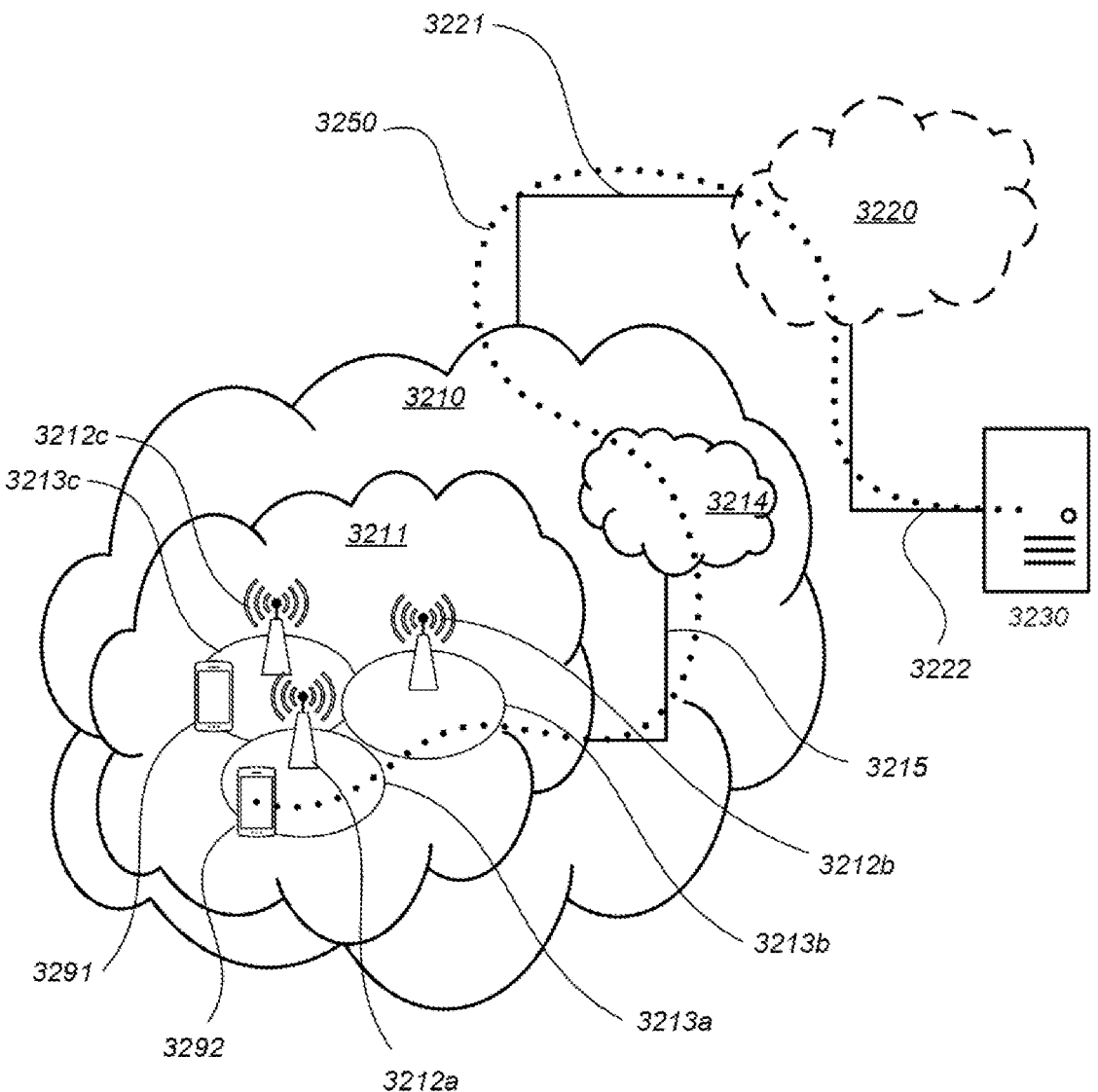
FIG. 4 schematically illustrates a telecommunication network connected via an intermediate network to a host computer.

With reference to FIG. 4, in accordance with an embodiment, a communication system includes a telecommunication network 3210, such as a 3GPP-type cellular network, e.g. the wireless communications network 100, which comprises an access network 3211, such as a radio access network, and a core network 3214. The access network 3211 comprises a plurality of base stations 3212a, 3212b, 3212c, e.g. the network node 110, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291, e.g. the UE 121, located in coverage area 3213c is configured to wirelessly connect to, or be paged by, the corresponding base station 3212c. A second UE 3292 e.g. the UE 122, such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 4 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 5. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 5) served by the base station 3320. The communication interface 3326 may be configured to facilitate a connection 3360 to the host computer 3310. The connection 3360 may be direct or it may pass through a core network (not shown in FIG. 5) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 5 may be identical to the host computer 3230, one of the base stations 3212_a_, 3212_b_, 3212_c_ and one of the UEs 3291, 3292 of FIG. 4, respectively. This is to say, the inner workings of these entities may be as shown in FIG. 5 and independently, the surrounding network topology may be that of FIG. 4.

Figure 5:
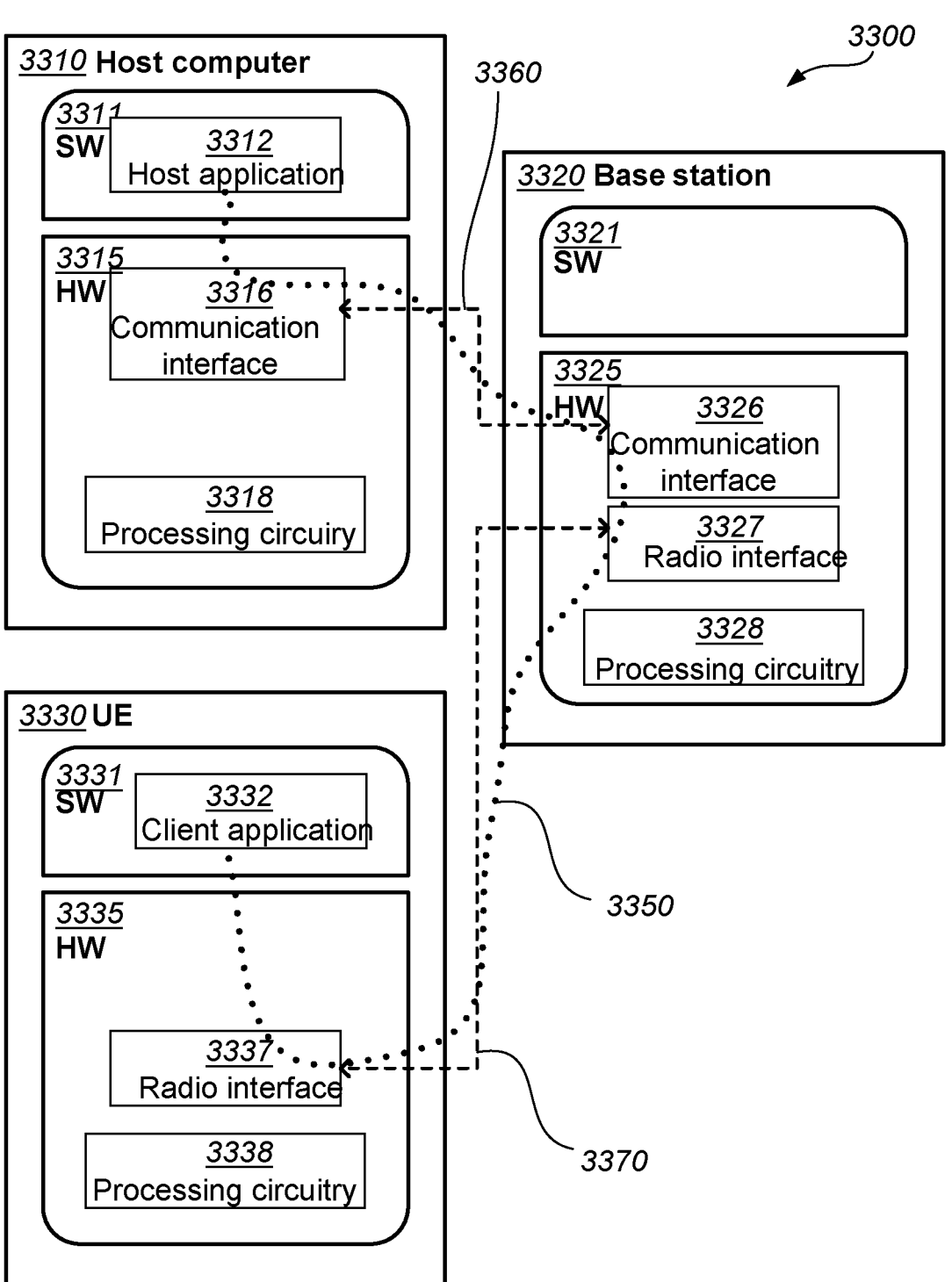
FIG. 5 is a generalized block diagram of a host computer communicating via a base station with a user equipment over a partially wireless connection.

In FIG. 5, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the RAN effect: data rate, latency, power consumption and thereby provide benefits such as corresponding effect on the OTT service: reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 6, 7:
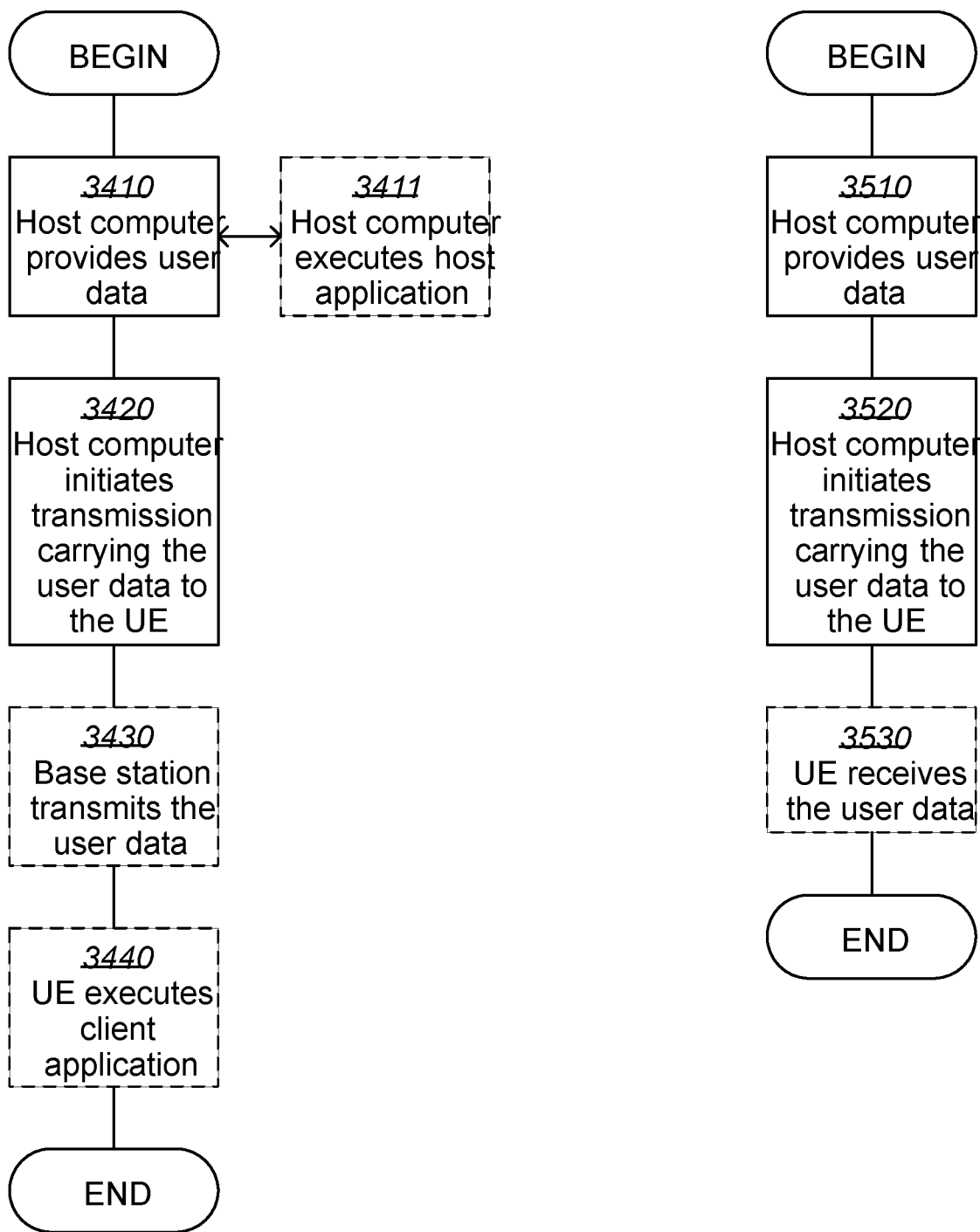
FIGS. 6-9 are flowcharts illustrating methods implemented in a communication system including a host computer, a base station and a user equipment.

FIG. 6 is a flowchart illustrating a method implemented in a communication system, in accordance with one embodiment. The communication system includes a host computer, a base station such as a AP STA, and a UE such as a Non-AP STA which may be those described with reference to FIG. 5 and FIG. 4. For simplicity of the present disclosure, only drawing references to FIG. 6 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 7 is a flowchart illustrating a method implemented in a communication system, in accordance with one embodiment. The communication system includes a host computer, a base station such as a AP STA, and a UE such as a Non-AP STA which may be those described with reference to FIG. 4 and FIG. 5. For simplicity of the present disclosure, only drawing references to FIG. 7 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 8, 9:
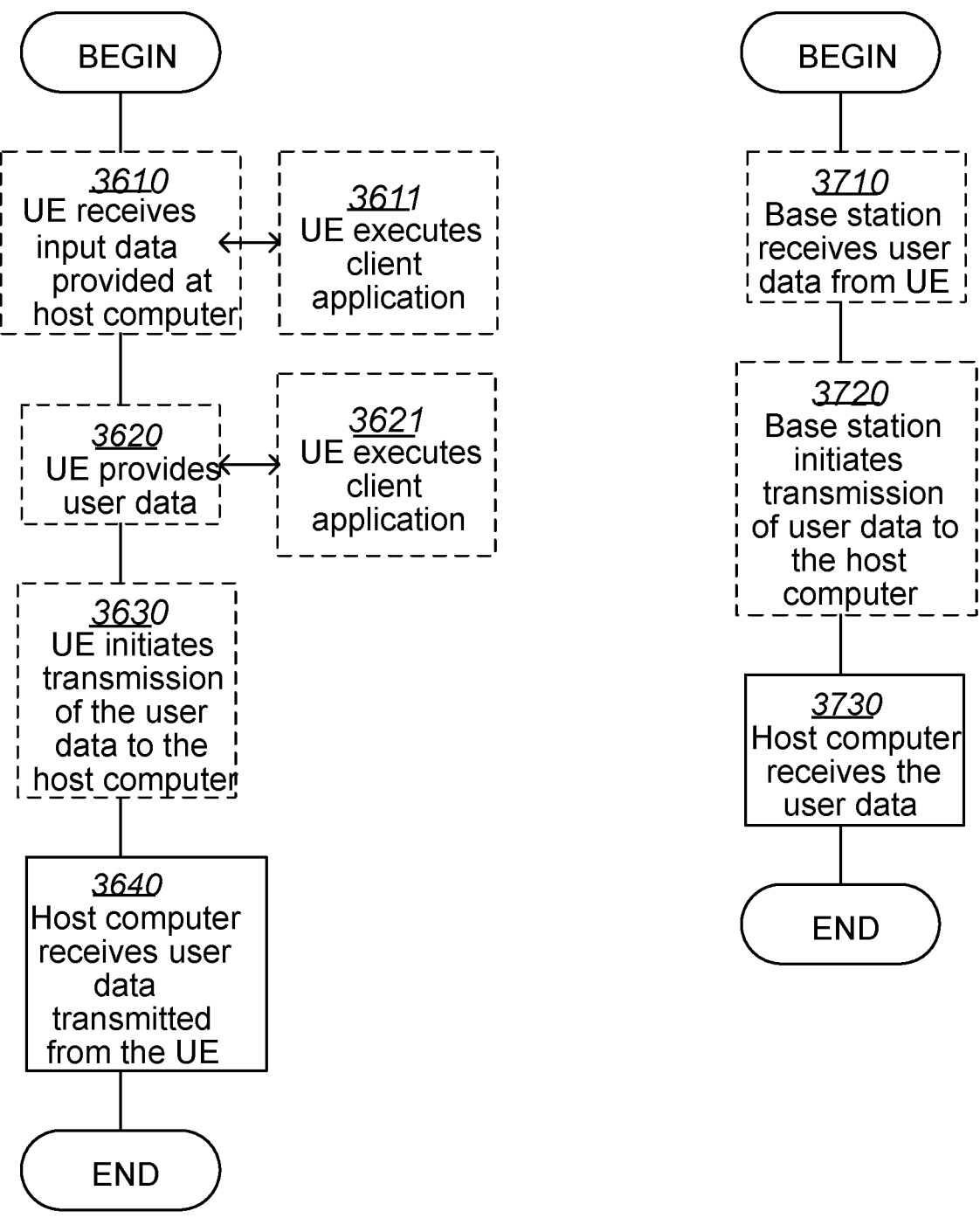

FIG. 8 is a flowchart illustrating a method implemented in a communication system, in accordance with one embodiment. The communication system includes a host computer, a base station such as a AP STA, and a UE such as a Non-AP STA which may be those described with reference to FIG. 5 and FIG. 5. For simplicity of the present disclosure, only drawing references to FIG. 8 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 9 is a flowchart illustrating a method implemented in a communication system, in accordance with one embodiment. The communication system includes a host computer, a base station such as a AP STA, and a UE such as a Non-AP STA which may be those described with reference to FIG. 4 and FIG. 5. For simplicity of the present disclosure, only drawing references to FIG. 9 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviations

CQI Channel Quality Information

DL Downlink gNB Next generation telecommunications node for mobile communication network SRS Sounding Reference Signal UE User Equipment UL Uplink

The invention claimed is:

1. A method performed by a network node for selecting a layer for a set of layers for transmissions between the network node and at least one User Equipment, UE, in a wireless communications network, which set of layers are to be spatial multiplexed for the transmissions, the method comprising:

calculating a first Information Carrying Capacity, ICC, associated with a first layer, which first ICC is calculated based on beam weights calculated for the first layer and an established channel estimate of the first layer;

selecting the first layer to the set of layers; and performing the following actions iteratively at least one time for layer selection:

adding a subsequent layer, adapting the calculated beam weights used for the layers in the set of layers to be used as subsequent beam weights for the subsequent layer, based on an established channel estimate of the subsequent layer, and the established channel estimates of the layers in the set of layers, calculating a subsequent ICC for the subsequent layer, based on the subsequent beam weights and the channel estimate of the subsequent layer, and deciding whether or not to select the added subsequent layer to the set of layers based on the ICCs of the layers in the set of layers and the subsequent ICC, by selecting the subsequent layer when the sum of the ICCs of the layers in the set of layers and the subsequent ICC is equal or larger than the sum of ICCs of the layers in the set of layers, and rejecting the subsequent layer when the sum of the ICCs of the layers in the set of layers and the subsequent ICC is lower than the sum of ICCs of the layers in the set of layers.

2. The method according to claim 1, wherein the actions for layer selection are performed iteratively until any one out of:

there are no more available layers to add, or the number of selected layers exceed a first threshold, or the allowed number of repeating the actions for layer selection exceeds a second threshold.

3. The method according to claim 1, wherein the adapting of the calculated beam weights, further is based on updating any one or more out of:

a calculation of a channel covariance matrix, a regularization of a channel covariance matrix, and an inversion of a regularized channel covariance matrix.

4. The method according to claim 1, wherein a first UE is associated with the selected first layer, and one or more additional UE is associated with a respective selected subsequent layer, and wherein the method further comprises:

based on the channel estimate of the first layer, scheduling a first transmission for the first UE to be spatial multiplexed for the transmissions, and for each subsequent layer that has been selected:

based on the channel estimate of the subsequent layer co-scheduling an additional transmission for the additional UE to be spatial multiplexed for the transmissions.

5. The method according to claim 1, wherein a Signal to Interference and Noise Ratio, SINR, of a layer the set of layers is a function of the channel estimate the first layer, and a subsequent SINR is a function of the channel estimate of the subsequent layer.

6. The method according to claim 1, further comprising:

establishing a channel estimate of the first layer; and calculating the beam weights for the first layer based on the established channel estimate.

7. A computer program comprising instructions stored on a non-transitory computer-readable storage medium, which when executed by a processor, causes the processor to perform actions comprising:

calculating a first Information Carrying Capacity, ICC, associated with a first layer, which first ICC is calculated based on beam weights calculated for the first layer and an established channel estimate of the first layer;

selecting the first layer to the set of layers; and performing the following actions iteratively at least one time for layer selection:

adding a subsequent layer, adapting the calculated beam weights used for the layers in the set of layers to be used as subsequent beam weights for the subsequent layer, based on an established channel estimate of the subsequent layer, and the established channel estimates of the layers in the set of layers, calculating a subsequent ICC for the subsequent layer, based on the subsequent beam weights and the channel estimate of the subsequent layer, and deciding whether or not to select the added subsequent layer to the set of layers based on the ICCs of the layers in the set of layers and the subsequent ICC, by selecting the subsequent layer when the sum of the ICCs of the layers in the set of layers and the subsequent ICC is equal or larger than the sum of ICCs of the layers in the set of layers, and rejecting the subsequent layer when the sum of the ICCs of the layers in the set of layers and the subsequent ICC is lower than the sum of ICCs of the layers in the set of layers.

8. A network node configured to select a layer for a set of layers for transmissions between the network node and at least one UE in a wireless communications network, which layers in the set of layers are to be spatial multiplexed for the transmissions, the network node further being configured to:

calculate a first Information Carrying Capacity, ICC, associated with a first layer, which first ICC is adapted to be calculated based on beam weights calculated for the first layer, and an established channel estimate of the first layer;

select the first layer to the set of layers; and perform the following actions iteratively at least one time for layer selection:

add a subsequent layer for the transmissions, adapt the calculated beam weights used for the layers in the set of layers to be used as subsequent beam weights for the subsequent layer, based on an established channel estimate of the subsequent layer, and the established channel estimates of the layers in the set of layers, calculate a subsequent ICC for the subsequent layer, based on the subsequent beam weights and the channel estimate of the subsequent layer, and decide whether or not to select the added subsequent layer to the set of layers based on the ICCs of the layers in the set of layers and the subsequent ICC, by selecting the subsequent layer when the sum of first ICC and the subsequent ICC is equal or larger than the first ICC, and rejecting the subsequent layer when the sum of the ICCs of the layers in the set of layers and the subsequent ICC is lower than the sum of ICCs of the layers in the set of layers.

9. The network node according to claim 8, wherein the network node further is configured to perform the actions for layer selection iteratively until any one out of:

there are no more available layers add, or the number of selected layers exceed a first threshold, or the allowed number of repeating the actions for the layer selection exceeds a second threshold.

10. The network node according to claim 8, wherein the network node further is configured to adapt the calculated beam weights, further based on updating any one or more out of a calculation of a channel covariance matrix, a regularization of a channel covariance matrix, and an inversion of a regularized channel covariance matrix.

11. The network node according to claim 8, wherein a first UE is associated with the first layer, and one or more additional UE is associated with a respective selected subsequent layer, and wherein the network node further is configured to:

based on the channel estimate of the first layer, schedule a first transmission for the first UE to be spatial multiplexed for the transmissions, and for each subsequent layer that has been selected:

based on the channel estimate of the subsequent layer co-schedule an additional transmission for the additional UE (122) to be spatial multiplexed for the transmissions.

12. The network node according to claim 8, wherein a Signal to Interference and Noise Ratio, SINR, of a layer of the set of layers is adapted to be a function of the channel estimate the first layer, and a subsequent SINR is adapted to be a function of the channel estimate of the subsequent layer.

13. The network node according to claim 8, further the being configured to:

establish a channel estimate of the first layer for the transmissions; and calculate the beam weights for the first layer based on the established channel estimate.

* * * * *